(12) United States Patent
Vitruk

(10) Patent No.: US 6,442,185 B1
(45) Date of Patent: Aug. 27, 2002

(54) ALL-METAL, DC EXCITED LASER WITH RF PRE-IONIZATION

(76) Inventor: Peter Vitruk, 20029, 99$^{th}$ Ct. NE., Bothell, WA (US) 98011

( * ) Notice: Subject to any disclaimer, the term of this patent is extended or adjusted under 35 U.S.C. 154(b) by 0 days.

(21) Appl. No.: 09/405,586

(22) Filed: Sep. 27, 1999

Related U.S. Application Data

(60) Provisional application No. 60/102,063, filed on Sep. 28, 1998.

(51) Int. Cl.$^7$ .............................. H01S 3/13; H01S 3/00; H01S 3/097
(52) U.S. Cl. ................. 372/87; 372/38.05; 372/29.013; 372/88; 372/86; 372/81; 372/83
(58) Field of Search .............................. 372/76, 81, 82, 372/83, 86, 87, 88, 38.05, 29.013

(56) References Cited

U.S. PATENT DOCUMENTS 5,097,472 A    3/1992  Chenausky ................... 372/38
5,479,428 A  * 12/1995  Kuzumoto et al. ........... 372/61
5,596,593 A    1/1997  Crothall et al. ................ 372/87

OTHER PUBLICATIONS

Sov. J. Plasma, 1982, Myshenkov et. al. Phys., v.8, # 4, p. 397.

IEEE J. Quantum., 1994, Vitruk et. al. Electr., v.30, # 7, p. 1623.

* cited by examiner

Primary Examiner—Frank G. Font
Assistant Examiner—Armando Rodriguez

(57) ABSTRACT

The present invention provides a novel and improved technique for achieving a combined RF-DC gas discharge in the optical cavity of the gas laser. The combination of the fast pre-ionization with the transverse RF discharge and the high power excitation with the highly-efficient longitudinal DC discharge allows for a high-speed laser gain modulation of the active medium of the high-power gas laser. At the same time, the all-metal electrode system allows for a very compact, reliable and low cost design of the gas laser.

20 Claims, 3 Drawing Sheets

ALL-METAL, DC EXCITED LASER WITH RF PRE-IONIZATION

REFERENCE TO PROVISIONAL APPLICATION

This application claims the benefit of the U.S. Provisional Application No. 60/102,063, filed Sep. 28, 1998.

TECHNICAL FIELD

This invention relates to gas lasers, especially to diffusion-cooled $CO_2$ lasers with improved pulsing performance.

BACKGROUND OF INVENTION

Diffusion-cooled $CO_2$ gas lasers have a number of useful industrial and medical applications. Traditionally, most commercial diffusion-cooled $CO_2$ gas lasers utilize a radio-frequency (RF) excitation discharge that is transverse to the laser's longitudinal axis. RF excitation allows for a very compact, low cost, all-metal laser tube designs, which are well known for their long life-time and reliability. Less popular, though still used mainly in medical $CO_2$ lasers, direct current (DC) discharge excitation, that is parallel to the laser's longitudinal axis, allows for less expensive (than RF) DC power source. It is often desirable to have a laser capable of emitting a continuous wave (CW) low power output and also capable of emitting a pulsed high power output. Unfortunately, RF excitation becomes very expensive to implement if high peak powers are required. On the other hand, the longitudinal DC discharge cannot be easily modulated which limits the pulsing rate of laser with DC excitation. However, a combination of RF excitation with DC excitation could overcome the limitations mentioned above if such excitation utilizes the low power RF and high power DC excitation circuits.

A prior art excitation method utilizing transverse RF discharge and longitudinal DC discharge is described by V. I. Myshenkov, et. al. in "Stability of a composite discharge sustained by static and RF electric fields. II. Mechanism for stabilizing effect of an RF field on the positive column of a DC discharge", *Soviet Journal of Quantum Electronics,* 1982, vol. 8, No. 4, pp. 397–400. This prior art method describes the diffusion-cooled $CO_2$ laser, which includes a glass discharge tube filled with the laser gas. A pair of long RF electrodes is located outside of the glass tube parallel to its axis so that the transverse RF discharge inside the tube is created when RF voltage is applied to the RF electrodes. A pair of short DC electrodes is located inside the glass tube on the opposite ends of the tube so that the longitudinal DC discharge inside the tube is created simultaneously with the RF discharge when DC voltage is applied to the DC electrodes. A disadvantage of this method is in the use of the glass discharge tube, which is fragile and expensive to manufacture.

Another prior art laser with combined transverse RF and transverse DC excitation is described in U.S. Pat. No. 5,097,472 (the '472 patent) issued to Peter P. Chenausky. This laser design utilizes two elongated metal electrodes to which both the RF and DC voltage is applied. The excitation circuitry includes the RF and DC power sources as well as the elements to electrically isolate one power source from the other. The pulsed RF voltage is applied to the electrodes and a uniform transverse RF discharge lights up in the interelectrode gap. Once the RF discharge is established, it commutes the energy from the DC power source through the electrodes and through the interelectrode gap filled with the RF discharge plasma.

A disadvantage of the technique described in the '472 patent is a very high cost of the RF power supply required to pre-ionize the gas at elevated gas pressure. Indeed, a 28 kW RF pulse is described for commuting a high power DC discharge through a 1 cm interelectrode space between 13.5 cm long electrodes in a $CO_2$ laser operated at 225 Torr. An average laser power output from the described electrode configuration can not exceed approximately 5–10 W for diffusion-cooled laser gas (Vitruk et. al., "Similarity and Scaling in Diffusion-Cooled RF-Excited Carbon Dioxide Lasers", *IEEE J. Quantum Electronics,* QE-30, 1994, pp. 1623–1634), which translates to approximately $2,000 price for commercially available $CO_2$ lasers. At the same time the price for the 28 kW RF power source is in excess of approximately U.S. $30,000 for a vacuum tube based design, which makes this approach prohibitively expensive.

Another disadvantage of the method described in '472 patent is a very low efficiency of the transverse DC excitation if a low pressure gas discharge is used. Indeed, a voltage across a 1 cm long DC gas discharge at 30 Torr is described in '472 patent as 400 Volts. It is well known in the art of electrical gas glow discharges that approximately 250–300 Volts is distributed across the cathode fall region, which does not contribute constructively to the creation of the laser gain in the DC discharge. Therefore, no more than approximately 30–40% of the DC power dissipated in the transverse DC discharge is actually deposited in the plasma column, in which the laser gain is created.

Another prior art laser with combined transverse RF and transverse DC excitation is described in the U.S. Pat. No. 5,596,593 (the '593 patent) issued to Katherine D. Crothall et. al. This prior art laser includes two pairs of elongated electrodes, which form a four walls surrounding a square bore of a $CO_2$ gas laser. First electrode pair is used to create a transverse RF discharge, while the second pair of electrodes is utilized to sustain a transverse DC discharge. Similarly to '472 patent, a disadvantage of the method described in '593 patent is a low efficiency of the transverse DC gas discharge excitation due to significant voltage drop across the cathode fall region of the DC discharge.

It is an object of present invention to simplify and improve the combined RF and DC excitation method used in high peak power, diffusion-cooled gas lasers. Present invention allows for a very simple, light-weight, low-cost, long life-time, all-metal design of the high power, efficient pulsed gas laser for either industrial or medical applications.

SUMMARY OF INVENTION

The present invention overcomes the above discussed and other disadvantages of the prior art by providing a novel and improved technique for achieving a combined RF-DC gas discharge in the optical cavity of the gas laser. A method for producing a beam of laser energy with the all-metal gas laser according to present invention consists of the following steps. First, a plurality of elongated metal electrodes is provided, at least two of the electrodes having a plurality of dielectrically coated surface areas and a plurality of metal surface areas located on a discharge surfaces of the electrodes. Second, the spacing between the metal surface areas is provided to be substantially greater than the spacing between the discharge electrodes. Third, an RF voltage is applied between at least two electrodes to establish a transverse RF gas discharge between the discharge surfaces of the two electrodes to which the RF voltage is applied. And finally, a DC voltage is applied between at least two electrodes, thereby producing a longitudinal DC gas discharge through said transverse RF gas discharge with the DC gas discharge current flowing between the metal surface areas of the two electrodes to which the DC voltage is applied.

The combination of the fast pre-ionization with the transverse RF discharge and the high power excitation with the highly-efficient longitudinal DC discharge allows for a high-speed modulation of the active medium of the high-power gas laser. At the same time, the all-metal electrode system allows for a very compact, reliable and low cost design of the gas laser.

DETAILED DESCRIPTION OF THE INVENTION

Figure 1A:
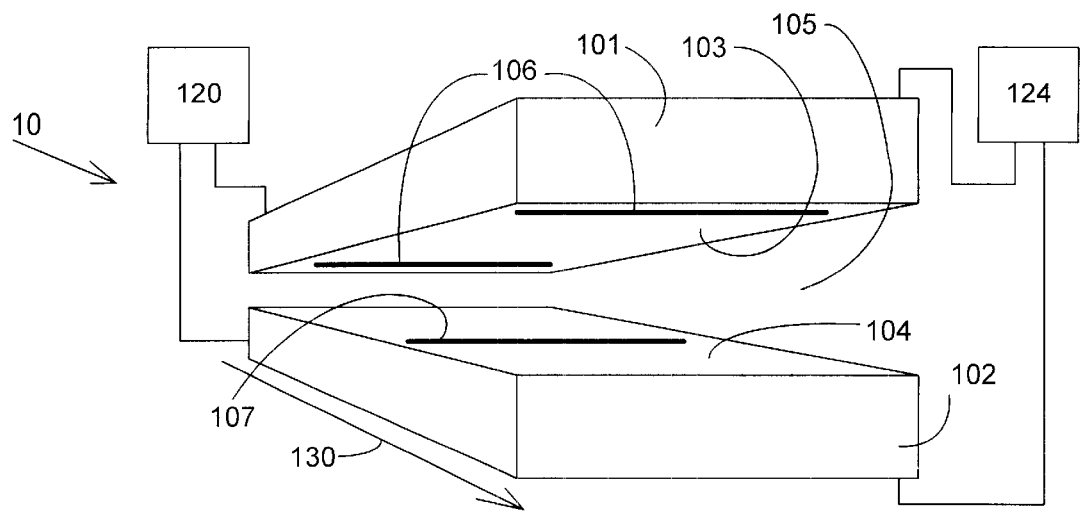
FIG. 1A is an isometric schematic diagram of the electrode system of the all-metal gas laser with combined RF-DC excitation according to first embodiment of present invention.

FIG. 1A is an isometric schematic diagram of the electrode system of the all-metal gas laser with combined RF-DC excitation according to first embodiment of present invention. The electrode system 10 consists of the metal electrodes 101 and 102 having a discharge surfaces 103 and 104 disposed so as to form an inter-electrode slab discharge gap 105 filled with the laser gas. The metal electrodes 101 and 102 are dielectrically coated with the exception of the surface areas 106 and 107. The metal surface areas 106 and 107 are made in the form of the strips parallel to each other and perpendicular to the longitudinal axis 130. The length of the strips 106 and 107 equals the widths of the electrodes 101 and 102. The area of the strips 106 and 107 is chosen so as to spread the cathode and anode parts of the discharge uniformly along the strips 106 and 107.

The electrodes 101 and 102 are electrically connected to the DC power source 120 and to the RF power source 124. Once a transverse RF discharge is ignited between the electrodes 101 and 102, then a longitudinal DC discharge can be established through the RF discharge between the metal surface areas 106 and 107. The laser gas pressure (in the range 30–100 Torr), the frequency (in the range 40–100 MHz) and the power of the RF power source 124 and the spacing between electrodes 101 and 102 (in the range 1–10 mm) are chosen to optimize the RF discharge characteristics such as its uniformity along the discharge surfaces 103 and 104, the power density in the discharge gap 105, etc. The voltage of the DC power source 120 is chosen to optimize the characteristics of the combined RF-DC discharge such as its power density and its uniformity in the direction perpendicular to the axis 130, etc. The spacing between the metal strip 107 and either of the strips 106 is substantially greater than the spacing between the electrodes 101 and 102 in order to ensure large length of the DC discharge. At the same time the spacing between strips 107 and 106 is not exceeding a certain critical value above which the DC discharge is no longer uniform in the direction perpendicular to the axis 130. Large length DC discharge results in greater voltage along the plasma column of the DC discharge relatively to the cathode fall voltage, so that the efficiency of the DC power deposition in the active lasing medium is increased.

The transverse RF slab discharge is characterized by the positive voltage-current (V-I) characteristics so it can uniformly fill the interelectrode gap 105. However, the plasma column of the self-sustained DC gas discharge has negative V-I characteristics and additional measures are needed in order to prevent its thermal instability and to stabilize the spatially uniform plasma column. The DC slab discharge plasma uniformity is achieved in the present invention by two means. First of all, the RF discharge pre-ionizes the gas so that the DC electric field can be somewhat less than needed for the self-sustaining the DC plasma column. As a result, the thermal instability of the plasma column could be prevented. Secondly, the areas of the metal strips 106 and 107 could be chosen so that the cathode and anode parts of the DC discharge fully fill the areas of the metal strips 106 and 107. Therefore, the cathode fall region is characterized by the positive V-I characteristics leading to increased stability of the DC discharge as a whole.

Figure 1B:
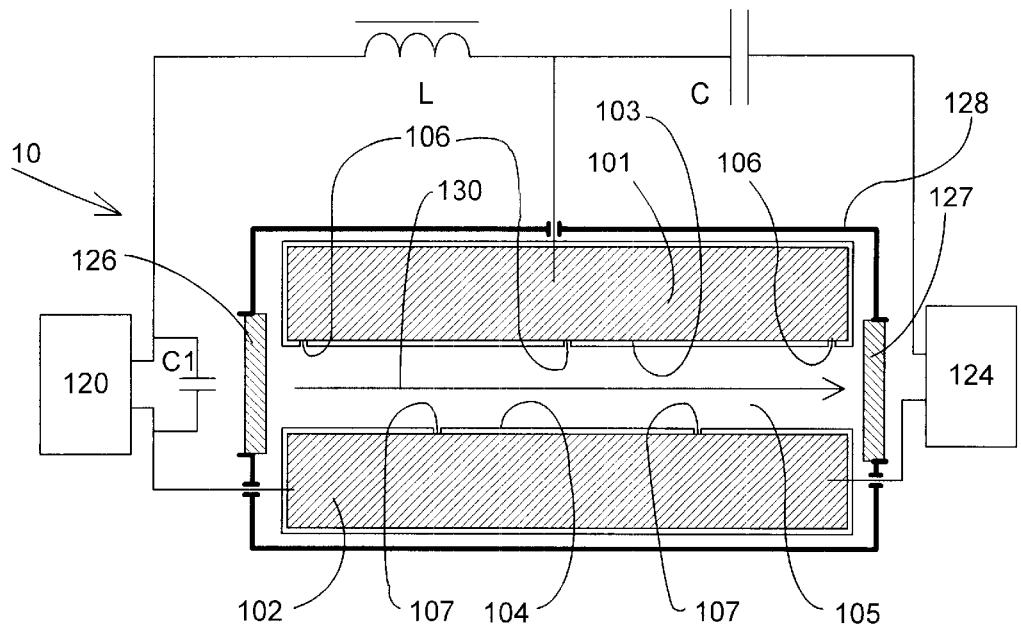
FIG. 1B is a side-view schematic diagram of the all-metal gas laser with combined RF-DC excitation according to second embodiment of present invention.

FIG. 1B is a side-view schematic diagram of the all-metal gas laser with combined RF-DC excitation according to second embodiment of present invention. The electrode system 10 consists of the metal electrodes 101 and 102 having a discharge surfaces 103 and 104 disposed so as to form an inter-electrode discharge gap 105 filled with the laser gas. The metal electrodes 101 and 102 are dielectrically coated with the exception of the surface areas 106 and 107. The metal surface areas 106 and 107 are made in the form of the strips parallel to each other and perpendicular to the laser axis 130. The electrodes 101 and 102 are electrically connected to the DC power source 120 and to the RF power source 124. Also shown are laser resonator mirrors 126 and 127 as well as laser housing 128 for containing a laser gas. The gas discharge performance of the electrode system 10 in FIG. 1A is similar to the performance of the electrode system of the laser 10 in FIG. 1B with the exception of the greater number of metal surface areas 106 and 107, which allows for greater length of the electrodes in the direction of the laser axis 130 and leads to increased power of the laser 10. FIG. 1B also shows additional elements such as capacitors C, C1 and an inductor L in the electrical circuit of the laser 10. The capacitor C is blocking a DC current from reaching the RF power supply 124, while the inductive choke L and capacitor C1 filter out the RF interference on the DC power supply 120.

Figure 2A:
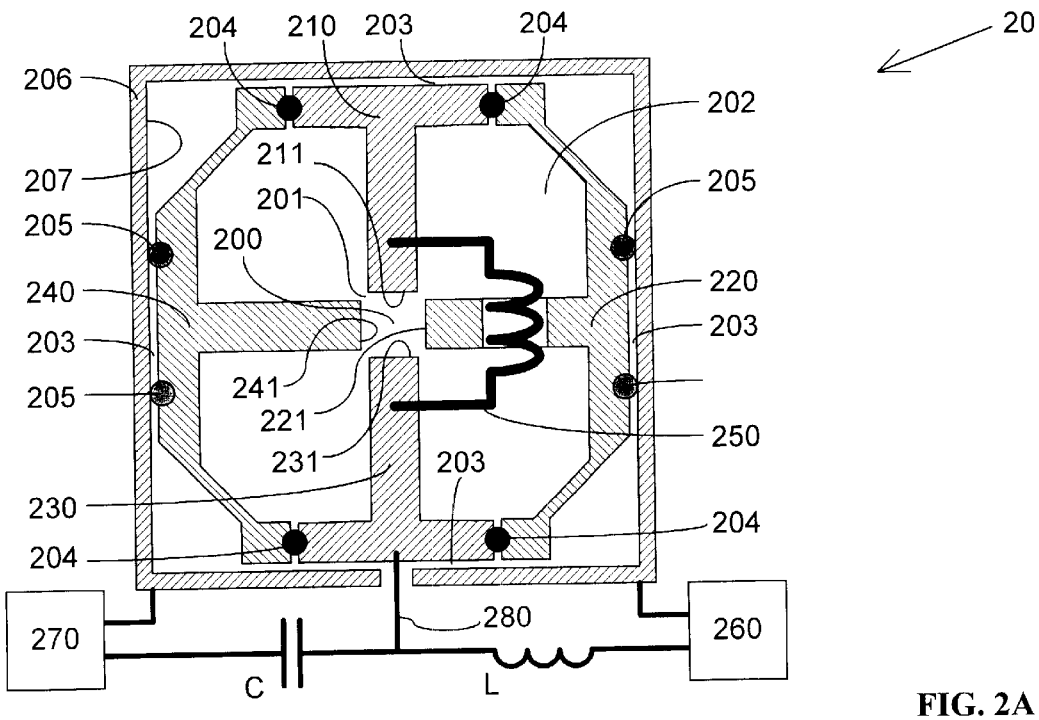
FIG. 2A is a cross-sectional schematic diagram of the all-metal gas laser with combined RF-DC excitation according to third embodiment of present invention.

FIG. 2A is a cross-sectional schematic diagram of the all-metal gas laser with combined RF-DC excitation according to third embodiment of present invention. Laser 20 includes a discharge bore 200 enclosed by the discharge surfaces 211, 221, 231 and 241 of the respective electrodes 210, 220, 230 and 240. The discharge bore 200 is connected by the longitudinal gaps 201 to the rest of the volume 202 of the laser gas. The electrodes 210, 220, 230 and 240 are separated by the gas gaps 203 and spacers 204 and 205 from each other and the housing 206. Spacers 204 are dielectric, while the spacers 205 are metal. Resonant inductor 250 is connected between the electrodes 210 and 230 which serve as an RF electrodes between which transverse RF discharge is sustained. The electrical feed-through 280 on the electrode 230 is connected to the DC power source 260 through the RF blocking inductor L and to the RF power source 270 through the DC blocking capacitor C.

The inner wall 207 of the housing 206 is dielectrically coated in order to prevent the DC discharges between electrodes and the housing. Spacing 203 is chosen small enough in order to eliminate a RF discharges between the electrodes and the housing. Additionally, if the RF electrodes 210 and 230 can be driven in anti-phase with the help of inductor 250, then electrode-to-housing voltage would be only the half of the discharge voltage, which further helps to eliminate the RF discharges between the electrodes 210, 230 and the housing 206. The design and performance of the laser 20 in FIG. 2A is further explained by the FIGS. 2B and 2C.

Figure 2B:
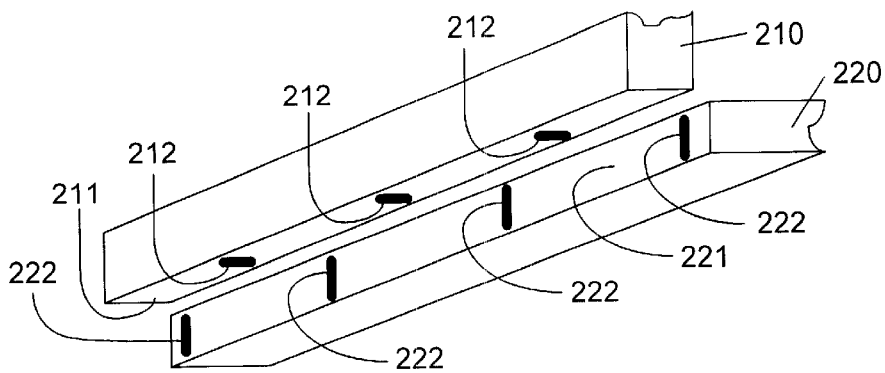
FIG. 2B is an isometric schematic diagram of the electrodes 210 and 220 from FIG. 2A according to third embodiment of present invention.

FIG. 2B is an isometric schematic diagram of the electrodes 210 and 220 from FIG. 2A according to third embodiment of present invention. The metal electrodes 210 and 220 are dielectrically coated all over their discharge surfaces 211 and 221 with the exception of the areas 212 and 222. The metal surface areas 212 and 222 serve as a DC discharge electrodes between which a longitudinal DC discharge is sustained. The structure of the electrode 230 (shown in FIG. 2A) is similar to electrode 210 shown in FIG. 2B, the structure of the electrode 240 (shown in FIG. 2A) is similar to electrode 220 shown in FIG. 2B. The laser discharge electrodes, shown in FIGS. 2A and 2B, function as follows. The low power, high-voltage RF pulses from the RF source 270 from a transverse RF discharge in the discharge bore 200 between the discharge surfaces 211 and 231. This triggers a high-power longitudinal DC discharge between the metal surface areas 212 of the high-DC-voltage electrodes 210 and 230 and the metal surface areas 222 of the grounded electrodes 220 and 240.

Figure 2C:
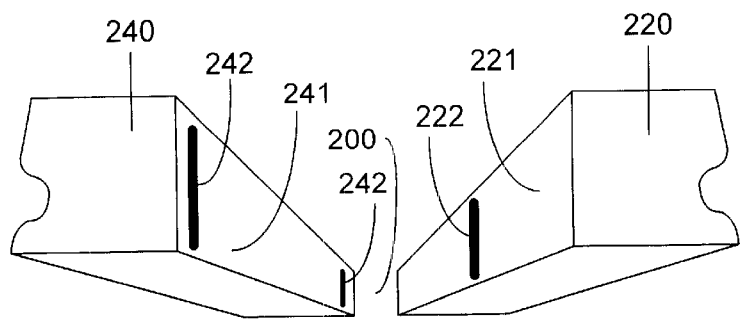
FIG. 2C is an isometric schematic diagram of the electrodes 220 and 240 from FIG. 2A according to forth embodiment of present invention.

FIG. 2C is an isometric schematic diagram of the DC electrodes according to forth embodiment of present invention. The forth embodiment of present invention is similar to laser shown in FIG. 2A with the exception that the DC power source is connected to the electrode 220, the spacers 205 between the electrode 220 and the housing 206 are dielectric, the electrodes 210 and 230 are dielectrically covered all over their surfaces and electrodes 220 and 240 are dielectrically coated according to FIG. 2C. The discharge surfaces 221 and 241 are facing the discharge bore 200 and are dielectrically coated all over except the areas 222 and 242. The metal surface areas 222 and 242 serve as a DC discharge electrodes when high-DC-voltage is supplied to the electrode 220 while electrode 240 is grounded by the metal spacers 205 between electrode 240 and housing 206.

Unlike the large discharge volume slab laser presented in FIGS. 1A and 1B, the small bore laser described in FIGS. 2A, 2B and 2C can function even with the negative V-I characteristics of the longitudinal DC discharge similarly to other small-bore lasers with longitudinal DC excitation. The DC discharge stabilization is achieved through the electrical ballast elements in the electrical circuit of the DC power source 260. This feature allows for a very large separation between the DC electrodes (i.e. metal surface areas 222 and 212 or 242). The role of the RF pre-ionization is to ensure fast and uniform switching of the plasma in the whole volume of the discharge bore.

Figure 3A:
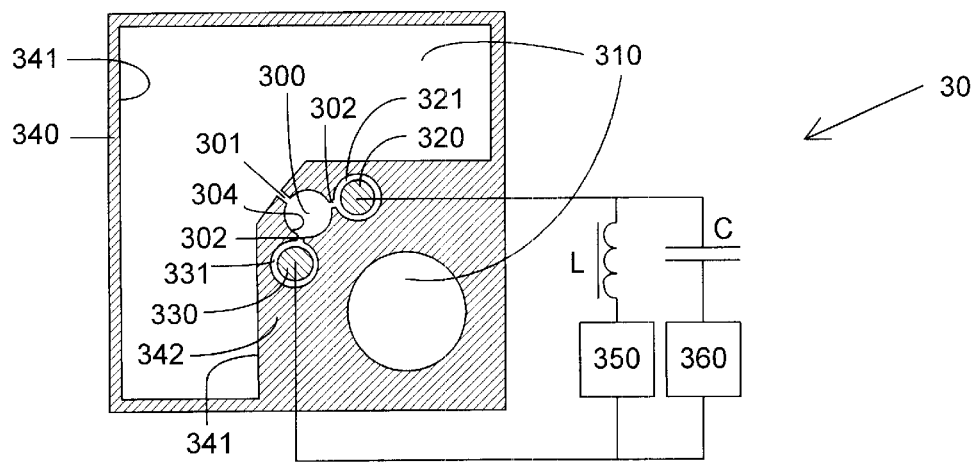
FIG. 3A is a cross-sectional schematic diagram of the all-metal gas laser with combined RF-DC excitation according to fifth embodiment of present invention.
Figure 3B:
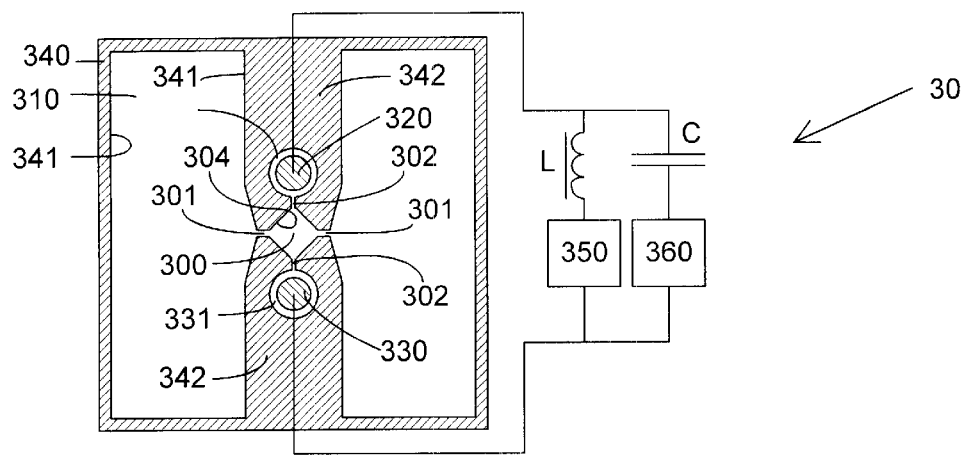
FIG. 3B is a cross-sectional schematic diagram of the all-metal gas laser with the combined RF-DC excitation according to sixth embodiment of present invention.

FIG. 3A is a cross-sectional schematic diagram of the all-metal gas laser with combined RF-DC excitation according to fifth embodiment of present invention. FIG. 3B is a cross-sectional schematic diagram of the all-metal gas laser with the combined RF-DC excitation according to sixth embodiment of present invention. Laser 30 in FIGS. 3A and 3B includes the discharge bore 300, the ballast volume 310 of the laser gas, the electrodes 320 and 330 and the housing 340. The discharge bore 300 having the longitudinal slots 301 and 302 connecting it with the ballast volume 310 and the channels 321 and 331 where the electrodes 320 and 330 are located. The width of the of the slots 302 is chosen accordingly to minimize the plasma losses and yet to provide low enough optical losses for the laser radiation propagating inside the discharge bore 300. The inner surface 304 of the discharge bore 300 is a part of the inner wall 341 of the housing 340 which can have a members 342 extruded so as to form all the necessary features of the laser bore 300. The inner walls 304 and 341 of the housing 340 and members 342 are dielectrically coated in order to prevent the DC discharges between electrodes and the housing. The DC power source 350 is connected between the electrodes 320 and 330 through the RF-blocking inductor L, while the RF power source 360 is connected between the electrodes 320 and 330 through the DC-blocking capacitor C. The design and performance of the laser 30 is further explained by the FIGS. 3C and 3D.

Figure 3C:
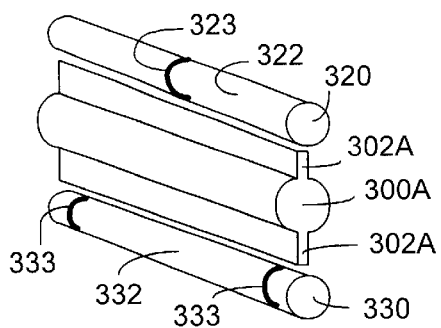
FIG. 3C is an isometric schematic diagram of the electrodes 320 and 330 from FIG. 3B and the transverse RF gas discharge according to sixth embodiment of present invention.
Figure 3D:
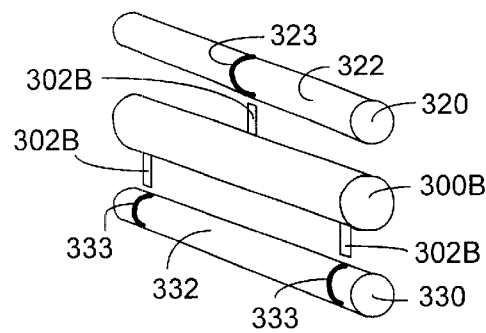
FIG. 3D is an isometric schematic diagram of the electrodes 320 and 330 from FIG. 3B and the longitudinal DC gas discharge according to sixth embodiment of present invention.

FIG. 3C is an isometric schematic diagram of the electrodes 320 and 330 from FIG. 3B and the transverse RF gas discharge according to sixth embodiment of present invention. FIG. 3D is an isometric schematic diagram of the electrodes 320 and 330 from FIG. 3B and the longitudinal DC gas discharge according to sixth embodiment of present invention. The metal electrodes 320 and 330 are dielectrically coated all over their surfaces 322 and 332 with the exception of the areas 323 and 333. The RF transverse discharge consists of the part 300A inside the bore 300 and parts 302A inside the longitudinal slots 302 (see FIG. 3B). The RF discharge 300A–302A creates a fast and uniform pre-ionization needed for fast and uniform high-power DC excitation. The longitudinal DC discharge consists of the part 300B inside the discharge bore 300 and parts 302B inside the longitudinal slots 302 (see FIG. 3B).

Similarly to laser in FIG. 2A, the small bore laser described in FIGS. 3A–3C can function with the negative V-I characteristics of the longitudinal DC discharge similarly to other small-bore lasers with longitudinal DC excitation. The DC discharge stabilization is achieved through the electrical ballast elements in the electrical circuit of the DC power source 350. This feature allows for a very large separation between the DC electrodes (i.e. metal surface areas 323 and 333). The role of the RF pre-ionization is to ensure fast and uniform switching of the plasma in the whole volume of the discharge bore.

PREFERRED EMBODIMENT

The preferred embodiment of the present invention is schematically shown in FIGS. 2A and 2B. All the laser tube parts, including the 40 cm electrodes 210, 220, 230 and 240 and the housing 206 are made of anodized aluminum. Discharge surfaces 211, 221, 231 and 241 have a non-anodized surface areas (0.5×0.2 cm² each) forming a pattern shown in FIG. 2B with the separation between the non-anodized stripes 212 and 222 being approximately 6.7 cm.

The 200 W pulsed excitation of the 0.5×0.5 cm² square bore filled to 60 Torr of laser gas mix (He:$CO_2$:$N_2$:Xe= 57:19:19:5) with transverse RF (at ISM frequency of 40.68 MHz) would produce approximately 20–24 Watts of peak laser power at the wavelength of 10.6 $\mu$m (assuming 10–12% electro-optical efficiency). The reduced electric field in the self-sustained plasma for the described above conditions is approximately estimated as 5 V.cm$^{-1}$.Torr$^{-1}$ (Vitruk et. al., "Similarity and Scaling in Diffusion-Cooled RF-Excited Carbon Dioxide Lasers", *IEEE J. Quantum Electronics,* QE-30, 1994, pp. 1623–1634).

The longitudinal DC discharge inside the 0.5×0.5 cm² bore (with the DC current flowing between the metal non-anodized surface areas of electrodes shown in FIG. 2), would require approximately 2 kV of inter-electrode DC voltage. The efficiency of the DC power deposition in plasma column could be approximately estimated as (2000–300)/2000=85% assuming the cathode fall voltage of 300 Volts. The high peak laser power performance could be achieved with the short enough RF-DC pulses (50 $\mu$sec to 0.5 msec) and low duty cycle (below 10–20%) so that laser gas could not heat up substantially neither during the single pulse nor during many consecutive short pulses. Approximately 1 A DC current pulse at 2 kV DC voltage needs to be applied during the RF pulse to the electrode 230 in FIG. 2A. This will be sufficient to sustain a longitudinal DC discharges through the RF plasma with a total electrical power of 2200 Watts dissipated in the plasma, resulting in approximately 190–240 Watts of peak laser power radiated by the laser (assuming 10–12% electro-optical efficiency).

It should be understood that even though numerous features and advantages of the present invention have been set forth in the foregoing description, the above disclosure is illustrative only. For example, the dimensions given for the various elements are exemplary only and could be modified by those skilled in the art in light of the foregoing discussions. Changes may be made in detail and yet remain within the broad principles of the present invention. Accordingly, the invention is not limited except as by the appended claims.

I claim:

1. A method for producing a beam of laser energy with a gas laser having a housing for containing a laser gas and a laser resonator mirrors placed at the opposite ends of the housing, said method comprising the steps of:

providing first and second elongated metal electrodes each having a plurality of dielectrically coated surface areas and a plurality of metal surface areas, said electrodes having a discharge surfaces disposed so as to define a discharge gap therebetween, said metal surface areas being located within said discharge surfaces, said metal surface areas being disposed so as to define a spacing between them;

providing said first and second electrodes being disposed so as to define a spacing between them;

providing the spacing between the metal surface areas being substantially greater than the spacing between the discharge electrodes;

applying RF voltage between the electrodes to establish a transverse RF gas discharge in said discharge gap between the discharge surfaces;

applying DC voltage between the electrodes, thereby producing a longitudinal DC gas discharge through said transverse RF gas discharge with the DC gas discharge current flowing between the metal surface areas of the first electrodes and the metal surface areas of the second electrode.

2. The method of claim 1 wherein said discharge gap is a slab discharge gap.

3. The method of claim 1 wherein said discharge surfaces are light-reflecting surfaces.

4. The method of claim 1 wherein said discharge surfaces are planar surfaces.

5. The method of claim 1 wherein said metal electrodes are made of aluminum and said dielectrically coated surfaces are anodized aluminum.

6. The method of claim 1 wherein said housing is made of anodized aluminum.

7. The method of claim 1 wherein said RF voltage is supplied from a RF power source and DC voltage is supplied from a DC power source.

8. The method of claim 7 further comprises the steps of preventing the delivery of RF power to the DC power source and preventing the delivery of DC power to the RF power source.

9. A method for producing a beam of laser energy with a gas laser having a housing for containing a laser gas and a laser resonator mirrors placed at the opposite ends of the housing, said method comprising the steps of:

providing a plurality of elongated metal electrodes, at least two of said electrodes having a plurality of dielectrically coated surface areas and a plurality of metal surface areas, said electrodes having a discharge surfaces disposed so as to define a discharge bore therebetween, said metal surface areas being located within said discharge surfaces, said metal surface areas being disposed so as to define a spacing between them;

providing said electrodes being disposed so as to define a spacing between them;

providing spacing between the metal surface areas being substantially greater than spacing between the discharge electrodes;

applying an RF voltage between at least two of said electrodes to establish a transverse RF gas discharge in said discharge bore;

applying a DC voltage between at least two of said electrodes, thereby producing a longitudinal DC gas discharge through said transverse RF gas discharge with the DC gas discharge current flowing between the metal surface areas of the two electrodes to which DC voltage is applied.

10. The method of claim 9 wherein said metal electrodes are made of aluminum and said dielectrically coated surfaces are anodized aluminum.

11. The method of claim 9 wherein said housing is made of anodized aluminum.

12. The method of claim 9 wherein said discharge surfaces are light-reflecting surfaces.

13. The method of claim 9 wherein said RF voltage is supplied from a RF power source and DC voltage is supplied from a DC power source.

14. The method of claim 13 further comprises the steps of preventing the delivery of RF power to the DC power source and preventing the delivery of DC power to the RF power source.

15. A method for producing a beam of laser energy with a gas laser having a housing for containing a laser gas and a laser resonator mirrors placed at the opposite ends of the housing, said method comprising the steps of:

providing a plurality of elongated, dielectrically coated metal members located on the inner wall of said housing and disposed so as to define an elongated discharge bore therebetween, said discharge bore having a plurality of elongated slots, providing first and second elongated metal electrodes each having a dielectrically coated surface areas and a metal surface areas, said electrodes having a discharge surfaces, said metal surface areas being located within said discharge surfaces;

providing said electrodes being disposed so as to define a spacing between them;

providing spacing between the metal surface areas being substantially greater than spacing between the electrodes;

providing at least one discharge surface being disposed in parallel and in closed proximity to the elongated slot so as to define a spacing between the discharge surface and the discharge bore being substantially less than the spacing between the electrodes;

applying RF voltage between the electrodes to establish a transverse RF gas discharge in said discharge bore between the discharge surfaces;

applying DC voltage between the electrodes, thereby producing a longitudinal DC gas discharge through said transverse RF gas discharge with the DC gas discharge current flowing between the metal surface areas of the first electrodes and the metal surface areas of the second electrode.

16. The method of claim 15 wherein said metal electrodes are made of aluminum and said dielectrically coated surfaces are anodized aluminum.

17. The method of claim 15 wherein said housing is made of anodized aluminum and said metal members are made of anodized aluminum.

18. The method of claim 15 wherein said discharge surfaces are light-reflecting surfaces.

19. The method of claim 15 wherein said RF voltage is supplied from a RF power source and DC voltage is supplied from a DC power source.

20. The method of claim 19 further comprises the steps of preventing the delivery of RF power to the DC power source and preventing the delivery of DC power to the RF power source.

* * * * *